RADIATION AMPLIFIER

Filed Nov. 10, 1954 2 Sheets-Sheet 1

INVENTORS.
RICHARD K. ORTHUBER
LEE R. ULLERY
CYRIL L. DAY

BY George R. Gust
ATTORNEY

RADIATION AMPLIFIER

Filed Nov. 10, 1954

2 Sheets-Sheet 2

INVENTORS.
RICHARD K. ORTHUBER
LEE R. ULLERY
CYRIL L. DAY
BY George R. Gust
ATTORNEY United States Patent Office 2,837,661
Patented June 3, 1958

2,837,661

RADIATION AMPLIFIER

Richard K. Orthuber and Lee R. Ullery, Fort Wayne, and Cyril L. Day, Huntington, Ind., assignors to International Telephone and Telegraph Corporation Application November 10, 1954, Serial No. 467,922

9 Claims. (Cl. 250—213)

The present invention relates to a radiation amplifier, and more particularly to a solid-state amplifier for reproducing a given radiation image.

In Orthuber continuation-in-part application Serial No. 332,733, filed January 22, 1953; Ullery application Serial No. 362,204, filed June 17, 1953, now Patent No. 2,773,992; and Orthuber et al. application Serial No. 409,982, filed February 12, 1954, different arrangements of a display-amplifying device similar to this invention are disclosed and claimed. This display-amplifying device was embodied in a laminated cell construction in which the laminae, for all practical purposes, were arranged in the manner of an ordinary parallel-plate condenser having a dielectric material interposed between the two plates. The plates of the condenser were composed of electrically conducting material, such as metal, in such thin films as to be transparent. The dielectric was comprised of two parts: viz., a lamina of photoconductive material, such as cadmium sulphide, having high dark electrical impedance and a contiguous lamina of electroluminescent material which may be excited to luminescence by the application thereto of a variable electric field. A typical suitable material for this electroluminescent lamina is a copper activated zinc oxide and zinc sulphide mixture as explained by Destriau in the 1937 edition, vol. 38, of Philosophical Magazine, on pages 700–739, 774–793, and 800–887. Other suitable materials are also described in Patents Nos. 2,566,349 and 2,624,857. Since the publication of this Destriau article, considerable developmental efforts have been expended in refining such electroluminescent materials for such purposes as illuminating rooms much in the same manner as is accomplished by conventional incandescent lamps. Materials used for lighting may be adapted to this invention in the light of the teaching of the above-mentioned applications and the present following disclosure.

With the application of an exciting alternating voltage of the two plates of the above-described display amplifier, a voltage drop may be considered to exist therebetween which is the sum of the two voltage drops occurring across the respective two dielectric layers. By designing these dielectric layers in a predetermined manner, the electroluminescent material may be prevented from luminescing in the absence of exciting light, but, on the other hand, caused to luminesce when light energy is projected onto the photoconductive layer. During this latter condition, the electrical characteristics of the photoconductive layer are so changed as to alter the distribution of voltages across the two layers in a direction to increase the magnitude of the voltage applied to the electroluminescent layer. With this increase of voltage, the electroluminescent layer will emit light of such brightness as corresponds to the change in electrical characteristics of the photoconductive layer.

Such an amplifier cell has particular utility in the reproduction of television and motion picture displays. This cell provides amplification of the image projected upon it, whereby an image of low brightness content produced by a relatively small television picture tube may be magnified many times and reproduced in highly brightened condition for clear observation.

Reproduction characteristics of this amplifier are dependent in part upon the design of the various laminae. Thus, by varying certain structural features, corresponding variations of reproduction characteristics may be achieved.

The invention of the above-mentioned Orthuber application Serial No. 332,733 was of laminated construction comprised of flat strata of photoconductive and electroluminescent materials sandwiched between flat transparent film electrodes. As was outlined in the subsequent applications above-mentioned, this laminated construction requires relatively thick photoconductive layers which are difficult to produce by means of currently-known techniques. In order to overcome this difficulty of producing a sufficiently thick photoconductive layer, the above-mentioned subsequent applications utilized thin evaporated films of photoconductive material laid on an irregular supporting surface so as to produce the necessary high impedance in the photoconductive material for controlling the electric field appearing over the electroluminescent layer.

This relatively thin photoconductive layer was so supported that incident exciting light impinged the layer at an inefficient angle, and was so disposed as to utilize only a portion of the incident light which did not allow the amplifier to operate at optimum efficiency.

It is an object of this invention to provide a radiation amplifier which more efficiently utilizes incident exciting radiation.

It is another object of this invention to provide a radiation amplifier in which the electroluminescent layer is more efficiently excited in discrete elemental areas for obtaining optimum luminescence.

In accordance with the present invention, there is provided a radiation amplifier comprising parallel arranged layers of photoconductive and electroluminescent materials which are intercoupled conductively to connect corresponding elemental areas of each layer together. The photoconductive layer is geometrically arranged such that it is fully exposed to the rays of incident radiation, and is in addition included in a series electrical circuit which permits the use of extremely thin layers of photoconductive material for providing the necessary control of exciting potentials for the electroluminescent layer.

For a better understanding of the invention, together with other and further objects thereof, reference is made to the following description taken in connection with the accompanying drawings, the scope of the invention being defined by the appended claims.

Figure 1:
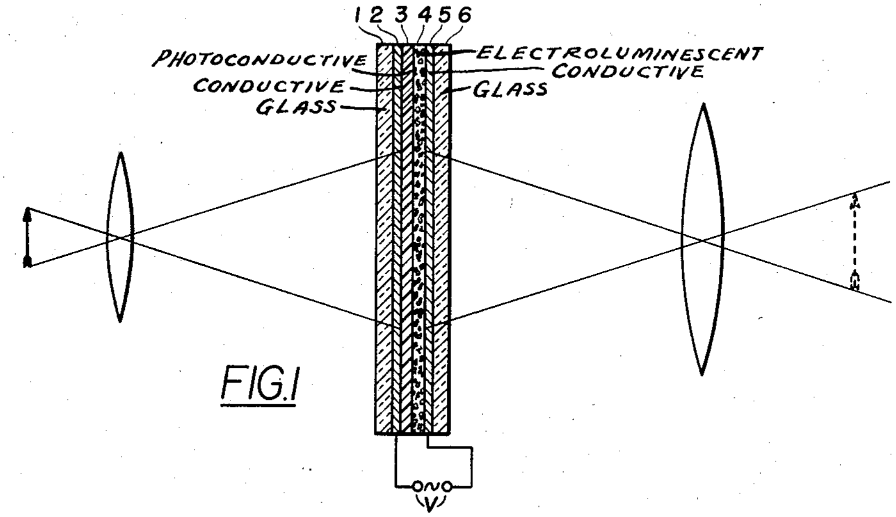
Fig. 1 is a cross-sectional view in diagrammatic form of one embodiment of this invention.

Referring to Fig. 1 of the drawings, the display amplifier is comprised of a laminated assembly of planar construction and is of suitable configuration such as circular or square in plan view. The laminations of this assembly comprise a glass or the like supporting plate 1, a transparent film of conductive material 2, such as evaporated silver applied to one side of the plate 1, a layer 3 of photoconductive material (cadmium sulphide, for example), a layer of electroluminescent material 4 contiguous with the layer 3, another film 5 of conductive material which may be identical with the material film 2, and a second supporting glass plate 6 which carries the film 5. A light-attenuating insulation lamina (not shown) may be interposed between the layers 4 and 5 for limiting light-feedback between these layers.

Figures 2, 4:
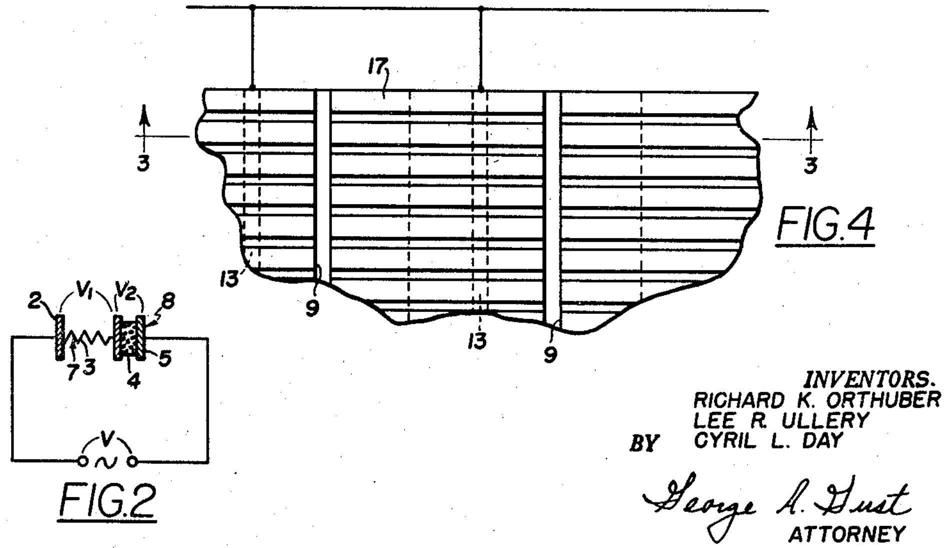
Fig. 2 is an equivalent circuit diagram used in explaining the operation of the invention.
Fig. 4 is a similar sectional view taken on section line 4—4 of Fig. 3.
Figure 5:
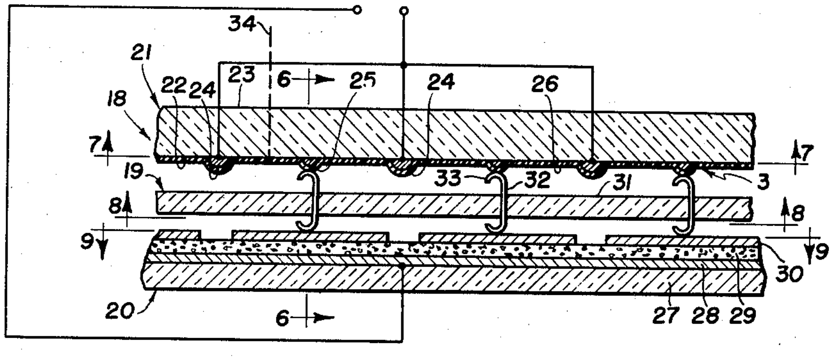
Fig. 5 is an enlarged fragmental cross-sectional view of another embodiment of this invention.
Figure 6:
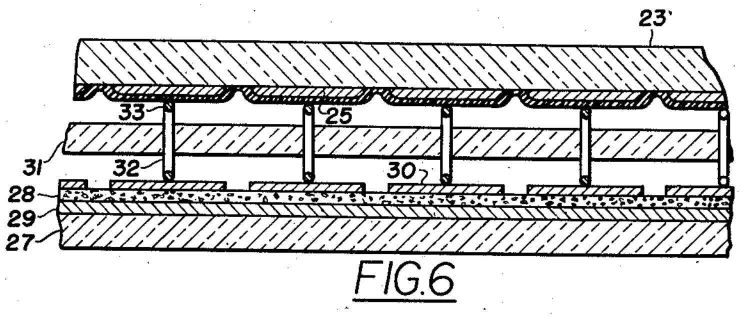
Fig. 6 is a cross-sectional view of Fig. 5 taken at right angles to the latter substantially along section line 6—6.

The equivalent electrical circuit of this assembly is represented by Fig. 2. The resistor, generally indicated by reference numeral 7, is comprised of the film electrode 2 and the photoconductive material 3, and the condenser, generally indicated by the reference numeral 8, is comprised of the electroluminescent layer 4 (the dielectric) and the film electrode 5. By application of an alternating exciting voltage of, for example, 600 volts at 800 cycles, across the two electrodes 2 and 5 as shown, a certain distribution of voltages or voltage division will occur over the two components 7 and 8, since they are connected in series. At first, if it is assumed that the components 7 and 8 are subjected to a condition of "no light" (in other words, placed in a completely darkened room), a certain voltage division will be obtained as indicated by the symbols V1 and V2, respectively. The sum of these voltages V1 and V2 will equal the applied voltage V. Now, if it is assumed that the photoconductive material of the resistor 7 is illuminated, the impedance characteristics of this material will correspondingly change, thereby altering this division of voltages. Since illumination tends to lower the impedance of the photoconductive material 3, an increase of voltage will be applied to the layer 4. This layer 4 (condenser 8) thereupon luminesces with a brightness dependent upon the magnitude of the alternating voltage (V2) applied thereto, so it becomes apparent that as the impedance of the component 7 decreases, the electroluminescent material 4 tends to luminesce. It is important that the photoconductive layer 3 possesses a relatively low capacity when no light is projected thereon. Similarly, the dark-resistance of this layer 3 should be high. With the impedance properly designed, the division of voltages across the two components 7 and 8 would be such as to impose substantially all of the voltage across resistor 7 and a very small voltage across the condenser 8 during "no light" conditions. By assuring that this latter voltage is sufficiently small, the electroluminescent lamina 4 will not luminesce. Now, assuming the condition of projecting incident light on the layer 3 of progressively increasing brightness, the impedance across the layer 3 will correspondingly decrease thereby altering the division of voltages across the components 7 and 8 in a direction to increase the voltage across the electroluminescent material 4. When the threshold of luminescent sensitivity is reached, the lamina 4 will luminesce to a degree dependent upon the magnitude of the voltage impressed thereover.

Known methods of preparing a photoconductive surface comprised of, for example, evaporated cadmium sulphide, have been found not to be satisfactory for producing the layer 3 to a sufficient thickness for providing the necessary controlling impedances. The principal reason for this difficulty resides in the fact that such known methods provide photoconductive surfaces which tend to fall apart or separate from their substrates when made to sufficient thicknesses. In order to obtain proper voltage control, it is however, necessary to provide sufficient thickness in order to reduce the admittance of the photoconductive layer, which if too high would lead to a light emission of the layer 4 even if layer 3 is not illuminated.

Figure 3:
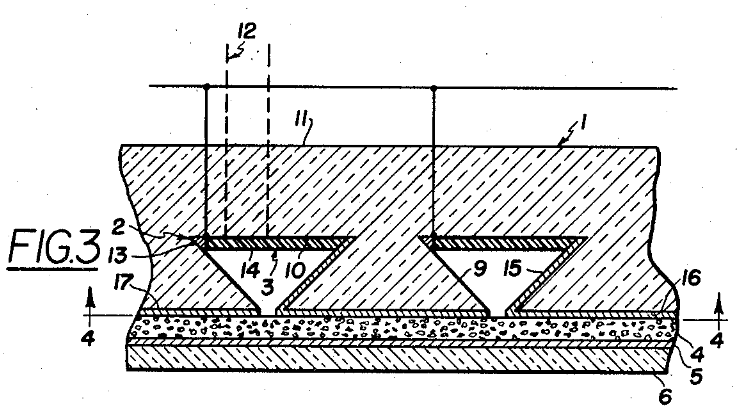
Fig. 3 is an enlarged fragmental cross-section of a specific embodiment of this invention.

Referring now in particular to Figs. 3 and 4, like numerals will indicate like parts. The reinforcing member 1 is preferably a transparent flat glass plate having opposite parallel surfaces, one surface being interrupted or formed with a plurality of longitudinally extending, equispaced, parallel grooves 9 which may be of triangular cross-section as shown to provide a base surface 10 of relatively wide dimension. This surface 10 is formed parallel with the outer surface 11 of the plate 1 which, in turn, lies in a plane substantially normal to the path of incident radiation indicated diagrammatically by the dashed lines 12.

Suitable metallic strips 13 lie in the corners of the grooves 9 as shown, and are conductively interconnected by any suitable means. In conductive contact with each electrode strip 13 is an evaporated layer 14 of photoconductive material such as cadmium sulphide. This layer is evaporated to such thickness as will produce the desired operating characteristics to be explained more fully in the following. In the present instance, cadmium sulphide is preferred as the photoconductive material, and the thickness of the film may range from about one (1) to twenty (20) microns. This film may be formed by any suitable method, such as evaporation by the method given by R. E. Aitchison in Nature Magazine, vol. 167, page 812. On the right-hand face of each groove 9, as viewed in Fig. 3, is applied a series of metallic connectors 15 which extend from the triangle base 10 and contact with the layer 14 to the adjacent surface 16 of the plate 1. It will be noted that a portion of these connectors 15 lie in the plane of the layer 14, and in certain of the claims this portion is characterized as a "third electrode." These connectors 15 are mutually insulated and may be comprised of any suitable metal such as silver which is applied by evaporation through a suitable mask or by any other technique well-known in the art. Similar strip contacts 17 are applied to the inner plate surface 16 as shown in Fig. 4 to extend from one groove 9 to the other. Each of these contacts 17 are insulated from each other and are conductively connected to respective ones of the connectors 15.

A layer 4 of electroluminescent material of suitable thickness as will luminesce in a manner as explained previously is laid in contact with the strip contacts 17. It is desirable that the contact between the elements 17 and the electroluminescent layer 4 be uniform over the contiguous areas such as to prevent the existence of air spaces. This is necessary to avoid capacitive reactances in these air spaces which are comparable to the reactance in the phosphor layer. Carefully grinding and polishing both the elements 17 and the layer 4 to flat complementary surfaces will serve to avoid these reactive air spaces. Simultaneously, it is highly desirable that the phosphor layer 4 be uniformly thick with a relatively high degree of accuracy to maintain the capacitive reactance thereover uniform. Other methods for avoiding these air spaces and for assuring close electrical coupling between the metallic elements 17 and the phosphor layer 4 are the subject of other applications. The film electrode 5 is laid against the layer 4 and may consist of evaporated silver or a Nesa coating such as that disclosed by the Kennedy Patent No. 2,559,969, issued July 10, 1951. This coating 5 preferably is applied to one surface of the glass plate 6 which serves in conjunction with the glass plate 1 to reinforce and maintain rigid the entire structure.

In operation, a pin-point ray of light indicated by one of the dashed lines 12 striking one portion of the film (3, 14) will serve to reduce the impedance of the latter as measured between the adjacent strip electrode 13 and the adjacent connecting segment 15. With an exciting voltage V applied to the strip electrode 13 and the electrode film 5, this reduction in impedance serves to increase the voltage applied to the phosphor layer 4 and to excite the latter in an area which is contiguous with the surface of the respective metallic contact 17. By forming the contact element 17 sufficiently small in both width and length dimensions, the areas thereof may be made to conform to elemental areas of an image to be reproduced. For example, the width of the contact 17 may be the same dimension as the width of a raster line of a twenty-one (21) inch television picture tube. Since the layer 14 is electrically in series with the terminal 13 and the film electrode 5, and the conductive path through the layer 14 is relatively long, the corresponding dark impedance of the latter will be high. The length of the base 10 and the film 14 thickness are made such that a sufficiently high impedance will be provided under "no light" conditions as will prevent luminescence of the corresponding area of the phosphor layer 4. However, upon applying incident radiation to this layer 12, this impedance should correspondingly reduce to increase the voltage applied to the respective area of the phosphor material 4 causing the latter to luminesce.

It will now be apparent that substantially all incident radiation is efficiently utilized in controlling the impedance characteristics of the photoconductive material 12, the only insensitive portions being those between the corners of adjacent grooves 9. These grooves 9 may be so arranged as to reduce these insensitive sections to a very small fraction of the entire area of layer 14.

Similarly, by using the contact elements 17 as shown, almost the entire mass of phosphor material 4 is subjected to the controlling voltages produced by the respective elemental areas of photoconductive material 14. This results in an efficient utilization of almost the entire phosphor mass for producing maximum brightness of the reproduced image.

While the cross-sectional shape of the groove 9 has been illustrated and described as being triangular, it will be apparent that the important limitations on this shape are that the base 10 be as long as possible as well as the supporting surfaces 16, the length dimension of the surface 16 being measured between adjacent grooves 9. Incident radiation will impinge the layer 14 at right angles and will not be reduced in intensity by deflection or refraction as was true in the specific embodiments of the preceding inventions covered in the aforementioned applications Serial Nos. 362,204 and 409,982. Thus, more incident radiation is available for controlling the impedance of the elemental areas of the photoconductive material 14.

The foregoing embodiment essentially comprises two plate assemblies, one assembly carrying the photoconductor and an electrode system and the other carrying the phosphor layer and its film electrode. In Figs. 5 through 9, a different embodiment is illustrated which is essentially comprised of three subassemblies, one being the photoconductor base generally indicated by the reference numeral 18, the second being a coupling unit 19 and the third being the phosphor base 20.

Figure 7:
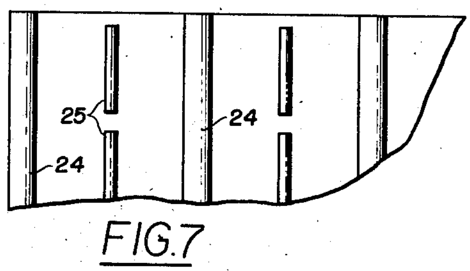
Fig. 7 is a plan view taken along section line 7—7 of Fig. 5.
Figure 8:
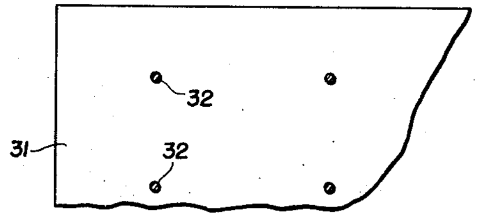
Fig. 8 is a similar view taken along the section line 8—8 of Fig. 5.
Figure 9:
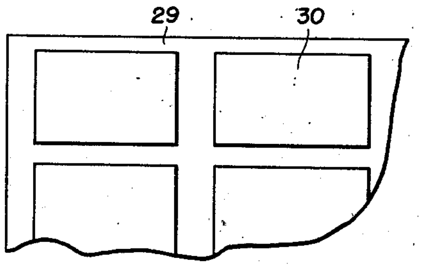
Fig. 9 is a view similar to Fig. 8 and taken along section line 9—9 of Fig. 5.

The photoconductor subassembly 18 is composed of a flat glass plate 21 having opposite parallel surfaces 22 and 23. On the surface 22 is mounted a system of metallic electrodes comprised of longitudinally extending strips 24, which are spaced apart a predetermined distance in parallel relation, and a series of individual contact bars 25 intermediate these strips 24 and parallel thereto. These bars 25 are characterized as "third electrodes" in certain of the claims. These contact bars 25 are more clearly illustrated in Fig. 7 as being collinear and separated by suitable distances such as will become apparent from the following description. All of the strips 24 are conductively connected together and thereby correspond to the amplifier terminal 2 of Figs. 1 and 2. These electrodes 24 may be applied to the base plate 21 by evaporation or spraying through a suitable mask or by printing. As shown in Fig. 7, these electrodes extend across the entire plate 1.

The mutually insulated contact bars 25 preferably have the same length dimension as the spacing between the two adjacent electrode strips 24.

The photoconductive layer 3, 26 (Fig. 5) is evaporated over this electrode system 24, 25 to a thickness of from two (2) to twenty (20) microns. Alternatively, the bars 25 may be deposited after the film 3, 26 has been deposited.

The phosphor base 20 comprises a flat glass plate 27 of any suitable thickness, which carries a transparent film electrode 28 (corresponding to the electrode 5 of Figs. 1 and 2). On this electrode film 28 is applied a layer of electroluminescent material 29. On top of this layer 29 is applied a mosaic of electrically separated metallic segments or rectangles 30. The latter may be produced by evaporation or spraying through suitable masks or by printing. The width dimension of the segments 30 preferably corresponds to the spacing of the electrode strips 24. Th segment length dimension preferably corresponds to the length of respective contact bars 25. The space between the adjacent segments 30 is sufficient to provide the necessary insulation for proper operation of the amplifier but should be as small as possible.

The coupling unit 19 is comprised of an insulating plastic plate 31 which carries a plurality of connecting springs 32. These springs are spaced in registry with the segments 30 on the phosphor plate 20 and the contact bars 25 on the photo-conductor plate 18. They project beyond the surfaces of the plate 31 and are provided with elastic hooks or loops 33 as shown.

When the three subassemblies 18, 19 and 20 are finally assembled, each spring 32 contacts a respective contact bar 25 and a phosphor contact element 30.

With reference to the operation of this embodiment, the ray of light 34 (Fig. 5) impinging the photoconductive material 26 at the spot shown will serve to reduce the impedance of the photoconductive material between the adjacent terminal strip 24 and contact bar 25. This reduced impedance is conductively coupled to the respective contact segment 30 by means of the spring 32 and the phosphor material under this segment 30 will be caused to luminesce. Substantially all of the exciting radiation is utilized for controlling the impedance of the photoconductor. Incident radiation impinges the photoconductive layer 26 perpendicularly, and reflection losses are thus reduced to a minimum. Further, the photoconductor assembly 18 and the phosphor assembly 20 can now possess considerable unevenness or irregularity in the adjacent surfaces, because the individual springs 30 provide the conductive coupling therebetween. This feature reduces the accuracy with which the two assemblies 18 and 20 must be fabricated.

In order to avoid excessive light-feedback from the phosphor material 29 to the photoconductive layer 26, the coupling plate 31 is preferably made of opaque material.

While there has been described what is at present considered the preferred embodiment of the invention, it will be obvious to those skilled in the art that various changes and modifications may be made therein without departing from the invention, and it is, therefore, intended in the appended claims to cover all such changes and modifications as fall within the true spirit and scope of the invention.

What is claimed is:

1. A radiation amplifier comprising first means having impedance characteristics which vary in response to variations in incident exciting radiation, electroluminescent means operatively associated with said first means and operative to luminesce in response to an electric field of predetermined magnitude, said first means and said electroluminescent means being connected in series, a first electrode conductively connected to said first means, a second electrode conductively connected to said electroluminescent means, an electric field applied to said electrodes distributing over both said first means and said electroluminescent means in accordance with the respective impedances thereof, and a third electrode interconnecting said first means and said electroluminescent means, said first means having a surface for receiving said incident radiation which is substantially perpendicular to the path of the latter, said first and third electrodes being spaced apart in the plane of said surface.

2. A radiation amplifier comprising first means having impedance characteristics which vary in response to variations in incident exciting radiation, electroluminescent means operatively associated with said first means and operative to luminesce in response to an electric field of predetermined magnitude, said first means and said electroluminescent means being connected in series, a first electrode conductively connected to said first means, a second electrode conductively connected to said electroluminescent means, the arrangement of said electrodes being such that an electric field applied thereto will distribute over both said first means and said electroluminescent means in accordance with the respective impedances thereof, and a third electrode interconnecting said first means and said electroluminescent means, said first means comprising a film of semi-conductive material disposed only in a plane which is substantially perpendicular to the path of said incident radiation, said first and third electrodes having portions spaced apart in the plane of said film.

3. A radiation amplifier comprising an elemental layer of photoconductive material having impedance characteristics dependent upon incident radiation, an elemental layer of electroluminescent material disposed substantially parallel to said photoconductive layer, conductive means interconnecting both elemental layers, an electrode terminal conductively connected to said photoconductive layer, the portions of said means and said terminal which contact said photoconductive layer being physically spaced apart whereby said photoconductive layer is series connected therebetween, and an electrode terminal for said electroluminescent layer, both electrode terminals being so arranged that an electric field connected thereto will distribute over both layers in accordance with the respective impedances thereof.

4. A radiation amplifier comprising an elemental layer of photoconductive material having impedance characteristics dependent upon incident radiation, an elemental layer of electroluminescent material disposed substantially parallel to said photoconductive layer, a contact element having one surface conductively engaging said electroluminescent layer, an electrode terminal conductively connected to said photoconductive layer, said element and said terminal being conductively connected to said photoconductive layer at spaced apart points whereby the latter is connected in series therebetween, and an electrode for said electroluminescent layer, both electrode terminals being so arranged that an electric field connected thereto will distribute over both layers thereof.

5. A radiation amplifier comprising a transparent reinforcing member which admits incident radiation therethrough, an elemental layer of photoconductive material having impedance characteristics dependent upon incident radiation and carried by said member, said layer being disposed in a plane normal to the path of said radiation, an elemental layer of electroluminescent material disposed substantially parallel to said photoconductive layer, a contact element having one surface conductively engaging said electroluminescent layer, an electrode terminal conductively connected to said photoconductive layer, said element and said terminal contacting said photoconductive layer at spaced apart points whereby the latter is connected in series therebetween, and an electrode for said electroluminescent layer, both electrode terminals being so arranged that an electric field connected thereto will distribute over both layers in accordance with the respective impedances thereof.

6. A radiation amplifier comprising a transparent reinforcing member which admits incident radiation therethrough, an elemental layer of photoconductive material having impedance characteristics dependent upon incident radiation and carried by said member, said layer being disposed in a plane normal to the path of said radiation, an elemental layer of electroluminescent material, an elemental contact having a surface area conductively engaging said electroluminescent layer, means conductively coupling said contact with said photoconductive layer, a voltage-applying terminal engaging said photoconductive layer at a point spaced from said means whereby said photoconductive layer is connected in series therebetween, and a voltage-applying terminal for said electroluminescent layer, both terminals being so arranged that an electric field connected thereto will distribute over both layers in accordance with the respective impedances thereof.

7. A radiation amplifier comprising a transparent reinforcing member having parallel opposite faces, a layer of photoconductive material having impedance characteristics dependent upon incident radiation and disposed on one of said faces, a first voltage-applying terminal carried by said one face in contact with said photoconductive layer, a layer of electroluminescent material, a flat contact element having one surface in contact with said electroluminescent layer, a conductive member in contact with said photoconductive layer and said element, said conductive member contacting said photoconductive layer at a point spaced from the contact of said terminal with said photoconductive layer whereby the latter is connected in series therewith, and a second voltage-applying terminal on said electroluminescent layer opposite said contact element whereby an electric field applied to both terminals will distribute over said layers in accordance with the respective impedances thereof.

8. A radiation amplifier comprising a transparent reinforcing sheet-like member having a plurality of longitudinally extending parallel grooves which are substantially triangular in cross-section, the base of the triangle disposed intermediate the opposite sides of the sheet-like member and parallel to one side of said member, a layer of photoconductive material on the base of each triangular groove, a strip electrode in one base corner of each groove in contact with said layer, a plurality of separated layers of conductive material on the surface of each groove which lies opposite said one base corner, said conductive layers extending into engagement with said photoconductive layer whereby the latter is series connected between said strip electrode and said conductive layer, each groove opening on one surface of said sheet-like member at the apex thereof, a plurality of mutually separated contact elements on said one member surface in contact with respective ones of said conductive layers whereby each contact element is conductively connected to different portions of the respective photoconductive layers, a layer of electroluminescent material engaging said contact elements, and a film electrode engaging said electroluminescent layer on the side opposite said contact elements, said electrode strips serving as one voltage-applying terminal and said film electrode serving as another voltage-applying terminal whereby an electric field applied thereto will distribute over said photoconductive layer and said electroluminescent layer in accordance with the respective impedances thereof.

9. A radiation amplifier comprising a flat sheet-like transparent reinforcing member having opposite surfaces which are substantially parallel, a plurality of electrode strips carried by one surface and being parallel and spaced apart a predetermined distance, a plurality of elongated collinearly arranged contact bars disposed intermediate and parallel to said strips, said bars being carried mounted on said one surface, a layer of photoconductive material provided on said one surface in contact with all of said strips and bars; a layer of electroluminescent material, a plurality of mutually insulated contact elements disposed on one side of said electroluminescent layer, an electrode film covering the other side of said electroluminescent layer; and a coupling plate assembly comprised of an insulating member having a plurality of spaced wires projecting therethrough, said assembly being interposed between said contact bars and said contact elements such that each bar will provide a conductive connection between one bar and one contact element, said strips being conductively connected together such that an electric field coupled to said strips and said film will distribute over said photoconductive and electroluminescent layers in accordance with the respective impedances thereof.

References Cited in the file of this patent

UNITED STATES PATENTS

| | | |
|---|---|---|
| 1,724,298 | Miller | Aug. 13, 1929 |
| 2,566,349 | Mager | Sept. 4, 1951 |
| 2,624,857 | Mager | Jan. 6, 1953 |

Notice of Adverse Decision in Interference

In Interference No. 90,475 involving Patent No. 2,837,661, R. K. Orthuber, L. R. Ullery and C. L. Day, Radiation amplifier, final decision adverse to the patentees was rendered July 19, 1963, as to claims 3, 4, 5, 6 and 7.

[*Official Gazette September 3, 1963.*]